United States Patent [19]

La Bate

[11] 4,055,881
[45] Nov. 1, 1977

[54] METHOD OF REBUILDING AN INGOT MOLD

[76] Inventor: Micheal Donald La Bate, 115 Hazen Ave., Ellwood City, Pa. 16117

[21] Appl. No.: 753,314

[22] Filed: Dec. 22, 1976

[51] Int. Cl.² .................... B23K 23/00; B22D 19/10
[52] U.S. Cl. .................... 29/401 A; 29/527.3; 164/54; 164/92; 427/135; 149/5; 149/37
[58] Field of Search .................... 164/53, 54, 92; 427/135; 149/5, 37; 29/527.3, 401 A

[56] References Cited

U.S. PATENT DOCUMENTS

| 3,160,537 | 12/1964 | Trofton, Jr. ........................... 149/37 |
| 3,264,696 | 8/1966 | Funk ........................... 164/54 |
| 3,360,845 | 1/1968 | Buschmann ........................... 164/92 X |
| 3,942,578 | 3/1976 | Kochik et al. ........................... 164/54 |

FOREIGN PATENT DOCUMENTS

| 1,582,944 | 8/1968 | France ........................... 164/53 |
| 2,050,542 | 4/1972 | Germany ........................... 164/53 |
| 418,263 | 8/1974 | U.S.S.R. ........................... 164/53 |

OTHER PUBLICATIONS

*Welding Handbook,* Fifth Edition, Section Three, edited by Arthur L. Phillips, pp. 41.7–41.10, 1964.

*Primary Examiner*—Ronald J. Shore

[57] ABSTRACT

A method of rebuilding the eroded area of an ingot mold such as used in casting steel ingots places a metal producing exothermic compound in a cleaned eroded area of the ingot mold to be rebuilt, ignites the compound and confines the molten metal produced by the exothermic reaction to the eroded area where it forms a welded bond with the metal of the ingot mold and fills the eroded area. A protective metal coating of a suitable welding rod metal may be deposited by electric arc or flame welding on the metal patch formed of the exothermic material.

7 Claims, 6 Drawing Figures

METHOD OF REBUILDING AN INGOT MOLD

BACKGROUND OF THE INVENTION

1. Field of the Invention

This invention relates to ingot molds, either iron or steel and a method and material for rebuilding the same to eliminate eroded areas therein.

2. Description of the Prior Art

No prior art is known relating to the rebuilding of an eroded area in an ingot mold. A rebuilt oxygen lance is seen in U.S. Pat. No. 3,743,814 wherein oxygen passageways are formed in a rebuilt metal tip of the oxygen lance and in U.S. Pat. No. 3,589,876 a built up strip mill guide is disclosed wherein grooves in the worn guide are filled up by a welding procedure.

SUMMARY OF THE INVENTION

A method of rebuilding a ingot mold and a material for use in such method comprises the cleaning and heating of the eroded area in an ingot mold placing a suitable quantity of a metal producing exothermic compound in the eroded area igniting it and confining the molten metal produced thereby to said eroded area whereby a weld bonded patch replaces the eroded area and reconditions the ingot mold making it suitable for again receiving molten metal to form an ingot therein.

DESCRIPTION OF THE PREFERRED EMBODIMENT

Figure 1:
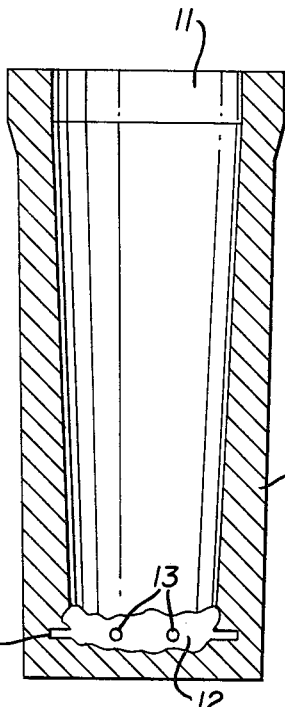
FIG. 1 is a vertical section through an eroded ingot mold of the big end up type showing an eroded area therein prepared for reconditioning.

In the form of the invention chosen for illustration herein, an ingot mold which may be either iron or steel is indicated in FIG. 1 of the drawings by the numeral 10 and it will be observed that it is a big end up ingot mold wherein a solidified ingot formed therein is removed therefrom in a stripping operation which lifts the ingot formed therein upwardly therefrom. The cavity in the ingot mold 10 is indicated by the numeral 11 and an eroded area 2 may be seen in the bottom of the cavity 11 as occurs from the continual pouring of molten metal into the ingot mold. The eroded area 12 renders the ingot mold incapable of further use as the ingot, upon cooling becomes locked into the mold and cannot be stripped therefrom. Heretofore such ingot molds have been scrapped.

Figure 2:
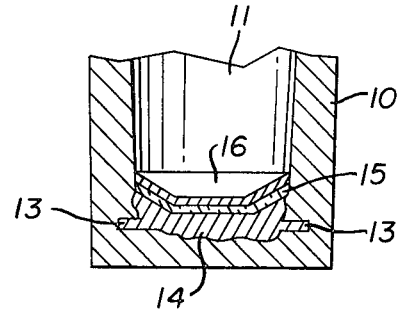
FIG. 2 is a vertical section through a portion of the ingot mold illustrated in FIG. 1 showing an exothermic compound positioned in the eroded area and confined thereto.

Still referring to FIG. 1 of the drawings, it will be observed that the cavity 12 has been cleaned so as to be free of scale or other impurities and a plurality of outwardly directed holes 13 have been drilled into the remaining metal of the ingot mold 10 from the area of the cavity 12. These holes may extend substantially half way into the remaining metal of the ingot mold 10. The ingot mold thus prepared is preferably heated, at least in the area of the cavity 12, to a temperature which may vary from 100° F. to 400° F. or greater and by referring to FIG. 2 of the drawings, it will be seen that a metal producing exothermic compound 14 has been positioned in the area of the cavity 12 in the ingot mold 10, ignited and confined therein by a metal member 15 preferably covered with an insulating member 16. The metal member 15 and the insulating member 16 are preferably of a shape corresponding with a desired shape of the lower end of the cavity 11 in the ingot mold 10. The metal producing exothermic compound as hereinafter described, produces molten metal which flows into the holes 13 and fills the area of the cavity 12 and upon solidifying forms a weld bonded patch filling the former eroded area 12. Upon cooling, the metal member 15 and/or the insulating member 16 may be removed from the patch formed of the metal producing exothermic compound 14 and as seen in FIG. 3 of the drawings the original and desired shape and area of the cavity 11 in the ingot mold 10 has been restored.

Figure 3:
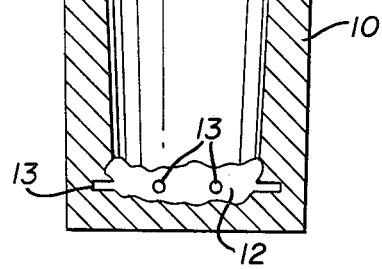
FIG. 3 is a vertical section through a portion of the ingot mold of FIG. 1 showing the reconditioned ingot mold.

Still referring to FIG. 3 of the drawings, it will be seen that a protective metallic coating 17 of a desirable welding rod metal is then deposited by arc or flame welding over the patch formed of the metal producing exothermic compound 14 and feathered into the surfaces defining the cavity 11 in the ingot mold 10.

It will thus be seen that the patch material formed of the metal producing exothermic compound is both mechanically and weld bonded in the ingot mold 10 because part of it extends into the holes 13 to form a mechanical anchor and the molten metal of the metal producing exothermic compound forms a weld bond with the cleaned metal surface of the eroded area 12 heretofore described. The rebuilt ingot mold may now be repeatedly reused for the casting of steel ingots and has been found to have a longer life than a comparable new cast iron or steel ingot mold.

Figure 4:
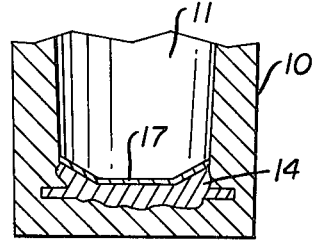
FIG. 4 is a vertical section of a portion of a big end down ingot mold showing an eroded area therein partially for reconditioning.
Figure 4:
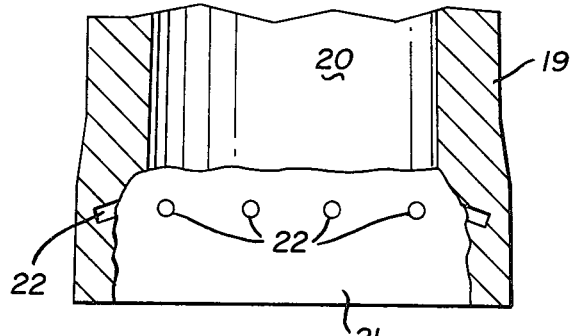
Figure 5:
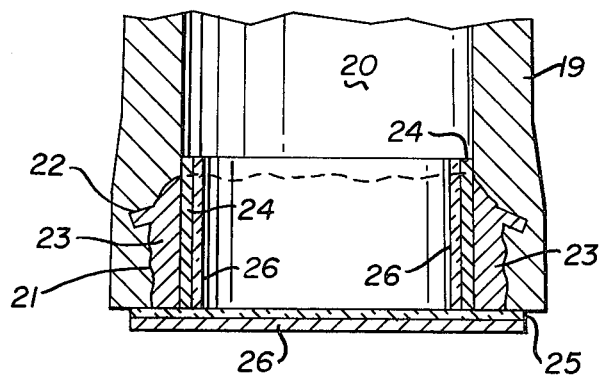
FIG. 5 is a vertical section of the ingot mold in FIG. 4 showing the positioning of a metal producing exothermic compound therein and confining the same to the eroded area.
Figure 6:
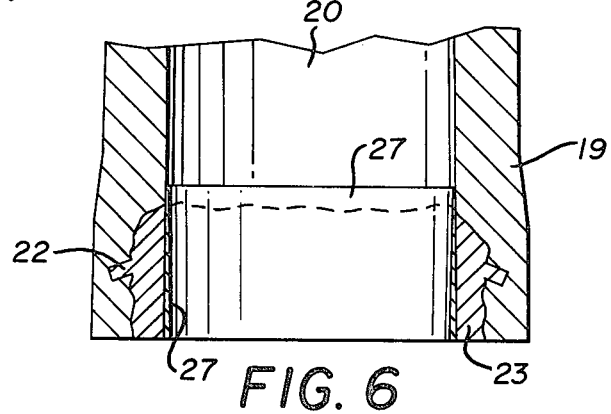
FIG. 6 is a vertical section through a portion of the ingot mold seen in FIGS. 4 and 5 and showing the reconditioned ingot mold.

Those skilled in the art will observe that steel ingots are frequently cast in big end down ingot molds and by referring to FIGS. 4, 5 and 6 of the drawings, a portion of such an ingot mold may be seen as indicated by the numeral 19. The mold 19 has a big end down cavity 20 therein and in use is positioned upon a stool so that molten metal poured thereinto will be confined thereby. Such pouring results in erosion of the lower side wall portions of the ingot mold 19 and such an eroded area is indicated by the numeral 21 in FIG. 4 of the drawings. The eroded area has been prepared for rebuilding by cleaning the same of scale and the like and having a plurality of holes 22 drilled outwardly therefrom into the remaining metal of the ingot mold 19. The holes are preferably drilled so as to incline outwardly and downwardly, generally oppositely to the direction of the ingot mold when moved upwardly in a stripping operation relative to an ingot cast therein. The ingot mold 19 may be positioned horizontally on one side or inverted if desired, so that a metal producing exothermic compound 23 may be positioned therein and retained in the eroded area 21 as illustrated in FIG. 5 of the drawings.

The metal producing exothermic compound 23 may be held in the cavity area by metal members 24 positioned and secured to the inner walls of the cavity 20 of the mold 19 and a metal member 25 may be positioned across the normally open bottom of the mold 19 to insure retaining the metal producing exothermic compound 23 in the cavity area. Insulating members 26 may also be used if desired. Ignition of the metal producing exothermic compound will produce molten metal filling the cavity area 21 and rebuilding the ingot mold 19 in conformity with its original cavity size and shape.

By referring now to FIG. 6 of the drawings, it will be seen that upon cooling of the patch material, which is the metal produced by the metal producing exothermic compound, the retaining members 24, 25 and 26 are removed and a thin protective layer 27 of a suitable metal such as from a welding rod, is deposited by electric arc or flame welding and feathered over the inner surfaces of the ingot mold 19 defining the cavity 20.

A suitable metal producing exothermic compound for use in the foregoing method may comprise between 16% and 22 % metallic aluminum, between 14% and 20% wallastonite (silicate of calcium), between 3% and 6% ferro silicon, between 4% and 8% manganese dioxide, between 40% and 60% fine iron scale and between 3% and 4% graphite. A typical batch may have the following analysis: Metallic aluminum — 16%, wollastonite — 14%, ferro silicon — 3%, manganese dioxide — 4% fine iron scale — 60% and graphite — 3%.

An equally suitable batch may comprise the following: Metallic aluminum — 22%, wollastonite — 20%, ferro silicon — 6%, manganese dioxide — 8%, fine iron scale — 40% and graphite — 4%.

Those skilled in the art will observe that the compound disclosed has satisfactory exothermic characterists enabling a high temperature reaction suitable for melting the compound and that the remaining compond resulting from the exothermic reaction will have an analysis close to the original analysis of the ingot mold in which it is being positioned. This is necessary to insure a welded physical bond to the metal of the ingot mold.

It will thus be seen that a method of rebuilding an ingot mold and a material for use in such method has been disclosed and having thus disclosed my invention.

I claim:

1. The method of rebuilding an ingot mold having an eroded area in the cavity thereof, said cavity having a known original configuration and comprising the steps of cleaning said eroded area, placing a metal producing exothermic compound in said eroded area and igniting said compound so as to produce a molten mass in said eroded area and containing said molten mass in said eroded area so as to reshape said cavity in said mold in accordance with its known original configuration, said metal producing exothermic compound comprising metallic aluminum, wollastonite, ferro silicon, manganese dioxide, fine iron scale and graphite, the fine iron scale an metallic aluminum being present in quantites sufficient to form thermite capable of melting the compound.

2. The method of rebuilding an ingot mold set forth in claim 1 and wherein the metal producing exothermic compound comprises between about 16% and 22% metallic aluminum, between about 14% and 20% wollastonite, between about 3% and 6% ferro silicon, between about 4% and 8% manganese dioxide, between about 40% and 60% fine iron scale and between about 3% and 4% graphite.

3. The method of rebuilding an ingot mold set forth in claim 1 and wherein the metal producing exothermic compound comprises 16% metallic aluminum, 14% wollastonite, 3% ferro silicon, 4% manganese dioxide, 60% fine iron scale and 3% graphite.

4. The method of claim 1 and wherein said ingot mold is heated to a temperature between 100° and 400° F. prior to igniting said compound.

5. The method of claim 1 and wherein said compound, after ignition, is confined to said eroded area.

6. The method set forth in claim 1 and wherein a protective metallic coating is deposited on the solidified compound filling said eroded area.

7. The method set forth in claim 6 and wherein said protective metallic coating is welding rod metal deposited by welding.

* * * * *